Patented June 30, 1942

2,288,410

UNITED STATES PATENT OFFICE 2,288,410

STABILIZATION OF PEROXIDE

Alfred Lippman, Jr., Weeks, La., assignor to Bay Chemical Company, Inc., New Orleans, La., a corporation of Louisiana No Drawing. Application November 19, 1940, Serial No. 366,313.

16 Claims. (Cl. 252—186)

This invention pertains to stabilization of alkali-earth-metal peroxides against deterioration by water.

Alkali-earth metal peroxides decompose in the presence of water to lose their efficacy as oxidizing agents. However, only when in contact with water in liquid form do they decompose readily. Deterioration of the peroxide occurs scarcely at all when the water is in vapor state.

Loss of oxidizing power of alkali-earth metal peroxide occurs, however, in the presence of moisture at a considerable rate if the peroxide is in contact with substances of hygroscopic nature.

In industrial use, peroxide may contact substances that promote attraction of moisture. Thus, in the baking industry, calcium peroxide is added to flour for various purposes, but in amount too small of itself to mix adequately. Better distribution is attained by mixing the peroxide with common salt to be used as an ingredient of the dough. But common salt promotes decomposition of the peroxide. Common salt, or sodium chloride, herein termed hygroscopic, strictly speaking, itself is not hygroscopic, but contains impurities that attract moisture and, more particularly, it may react with the calcium of the peroxide to form some amount of calcium chloride, which is readily deliquescent. Exposure of the chloride mixture to humid air, even for a day, substantially destroys the peroxide. Packaging is ineffective except in the most moisture-proof containers, and such containers are unduly expensive. The ordinary driers that are mixed with salt commercially, such as magnesium carbonate, do not impede decomposition of the peroxide, but on the contrary, seem to accelerate the deterioration.

An object of this invention is to preserve the oxidizing value of alkali-earth metal peroxides and particularly to preserve those values when the peroxide is intermixed with common salt.

A further purpose is to provide a composition of alkali-earth metal peroxide and common salt that remains substantially unchanged in quality under moist conditions; and that may be packaged in ordinary containers without particular attention to exclusion of moisture. A purpose also of this invention is to minimize caking of compositions that contain alkali earth-metal peroxide in common salt. Also a particularly important value of this invention is to maintain any selected ratio of peroxide to salt in such compositions so that the efficacy of the mixture in utilizing the peroxide may be dependable. Thus, users, such as bakers, may rely on obtaining the effects expected from these compositions. While an object of this invention is to minimize the deleterious effects of moisture on these peroxide-chloride compositions, yet a purpose is to maintain, nevertheless, ready solubility of the composition in liquid, such, for example, as is required when the salt mixture is incorporated into dough or batter.

These objects and others will be apparent in the following description of the principles and best mode of practicing this invention.

This invention utilizes the fact that certain powders when intimately intermixed with alkali-earth metal peroxide protect the peroxide against deteriorative effects of moisture. Preferably, the peroxide in powder form contains thoroughly distributed therethrough a quantity of water-insoluble salt of fatty acid. Such salt is capable of assuming the form of fine powder of less than No. 325 U. S. Standard Sieve (otherwise designated as 44-micron sieve), and most desirably is distributed in such fine form throughout the peroxide. In practice now deemed most advantageous under this invention, the fine powder of water-insoluble soap intermixed with the alkali-earth metal peroxide is a magnesium soap, and in specific form is magnesium laurate. A suitable range of proportion resides in 50 to 100 parts by weight of the water-insoluble soap to 100 parts of alkali-earth metal peroxide. Other suitable water-insoluble salts are calcium stearate or aluminum stearate, for example. The alkali-earth metal soaps in general are desirable, regarding magnesium as an alkali-earth metal.

As illustrative of benefits and practice of this invention, certain experimental data is of value. Tests were conducted by thoroughly intermixing finely divided calcium peroxide with amounts of metal soap of particle size of the order of minus No. 325 sieve, in the amounts indicated in the subjoined table. These compositions also contained sodium chloride as indicated, usually over 90% of the chloride. The compositions were exposed to atmospheric conditions for the number of days indicated in the table. The amount of calcium peroxide remaining at the end of the respective test periods was then determined and accepted as a measure of stability of the composition and of its oxidizing potency on storage under ordinary atmospheric conditions.

| Mix No. | Mixture | Percent $CaO_2$ left after days of exposure below— | | | |
|---|---|---|---|---|---|
| | | 1 | 3 | 15 | 30 |
| 1 | $CaO_2$ alone | .40 | .39 | .34 | .29 |
| 2 | $CaO_2$—60.0%<br>Mg. laurate—40% | .40 | .39 | .38 | .36 |
| 3 | $CaO_2$—0.4%<br>Salt—99.6% | .06 | .02 | 0 | 0 |
| 4 | $CaO_2$—0.4%<br>$MgCO_3$ salt drier—1.0%<br>Salt—98.6% | .05 | 0 | 0 | 0 |
| 5 | $CaO_2$—0.4%<br>Mg. laurate—0.01%<br>Salt—99.59% | .10 | .05 | 0.02 | 0 |
| 6 | $CaO_2$—0.4%<br>Mg. laurate—0.04%<br>Salt—99.56% | .21 | .10 | .04 | .02 |
| 7 | $CaO_2$—0.4%<br>Mg. laurate—0.12%<br>Salt—99.48% | .26 | .13 | .10 | .09 |
| 8 | $CaO_2$—0.4%<br>Mg. laurate—0.25%<br>Salt—99.35% | .34 | .21 | .19 | .16 |
| 9 | $CaO_2$—0.4%<br>Mg. laurate—1.0%<br>Salt—98.6% | .37 | .27 | .24 | .22 |
| 10 | $CaO_2$—0.4%<br>Cal. Stearate—0.25%<br>Salt—99.35% | .31 | .17 | .15 | .10 |
| 11 | $CaO_2$—0.4%<br>Al. Stearate—0.25%<br>Salt—99.35% | .26 | .18 | .15 | .12 |

This data exhibits various striking illustrations of repression of moisture effect in compositions comprising alkali-earth metal peroxide and chloride. It is evident from the first example that calcium peroxide alone, after about two weeks of exposure to moist air, does deteriorate to some degree and that after a month of such exposure has lost a considerable amount of its oxidizing potency. It is apparent also from Example 3 that when calcium peroxide is mixed in common salt even one day of exposure to ordinary atmosphere containing moisture is sufficient to destroy substantially all the peroxide. Also it is clear from Example 4 that with a commonly used drier such as magnesium carbonate in such a mixture the peroxide likewise is destroyed in one day. In fact the peroxide appears to undergo even more rapid destruction in the presence of such drier. It is shown further, as in Experiment 2, that a water-repellent soap is able to prevent the tendency of the peroxide of alkali-earth metal to deteriorate with moisture. This protective effect of the metal salt of fatty acid even in the presence of salt is illustrated by Experiments 5, and following. The efficacy of magnesium laurate is pronounced even in concentrations as low as 0.01%; for example 5 illustrates such a small amount of magnesium laurate effective to prolong the deterioration of peroxide over a period of 15 days. When the concentration of magnesium laurate is raised somewhat, though only to 0.04%, the peroxide is preserved in greater amount and is present even after 30 days of exposure. Increasing amounts of magnesium laurate increase preservation of the peroxide of alkali-earth metal in the presence of common salt so that with 0.25% of the metal soap approximately over a third of the peroxide remains after 30 days exposure. With 1% magnesium laurate over half the original peroxide remains after 30 days. At the end of one day exposure substantially all of the original peroxide remains.

It has been ascertained that particularly efficient protection of the peroxide is attained with about 30 to 150 parts of the water-repellent soap to 100 parts of the alkali-earth metal peroxide. However, additional amounts of the protective soap may be added to the composition, for example, as illustrated by Experiment 9, in which the proportion of magnesium laurate was about 250 to 100 parts of calcium peroxide.

Likewise, it is evident from this table of data that calcium stearate affords exceedingly effective protection of the peroxide and for short periods of protection, for example, one day, is substantially as efficacious as is magnesium laurate. Aluminum stearate affords effective protection of the peroxide and for periods of from 3 to 30 days affords substantially as much protection as does calcium stearate and nearly as much as does magnesium laurate for a commensurate period of exposure.

It is likely that the resistance of calcium peroxide to atmospheric moisture when the peroxide is taken alone is seriously impaired when certain solutions contact the peroxide; for example, when ordinary common salt, or sodium chloride, contacts the surface of the peroxide particles. The mechanism of impairment is not entirely clear, but there may be formation of concentrated solution of calcium chloride and this in turn may both attract moisture into the solution and also attract the calcium peroxide, or decomposition products thereof, into solution in such manner as to consume the peroxide rapidly. The decomposition products of the peroxide doubtless are such that, once formed, their removal from the sphere of reaction occurs, with consequent acceleration of additional decomposition. In this application, the term hygroscopic substance includes reagents capable of forming hygroscopic products. The hygroscopic product may exist as solid or it may exist in a film of moisture as a concentrated solution.

The function of finely divided water-insoluble particles when such particles are extremely finely divided may be mechanical. Such particles may be drawn into extensive surface contact with the peroxide particles, and apparently into preferential contact with the alkali-earth metal peroxide particles as compared with the sodium chloride particles. This is evident since relatively small amounts of magnesium laurate, for example, are effective protecting agents for the peroxide. Arrangement of the finely divided protective particles about the peroxide particles may serve simply as a retardant barrier against access of solution to the peroxide. Such coating effect of finely divided insoluble particles for the peroxide particles particularly may be of primary importance and may be based on underlying attractive forces between the solids that are not clearly understood. This function of the present invention may be manifested by considerable variety of finely powdered particles of water-insoluble nature.

However, the admixed finely divided protective agents that are preferred further may depend on their water-repellent qualities. The finely divided coating of insoluble solid, may, as the concentration of moisture increases about the peroxide, tend to wall back any accumulation of liquid from the peroxide. Thus only water vapor rather than solution would actually contact the peroxide.

However, further benefits are obtained when the adherent and the repellent properties of the added particles extend to resist certain hygroscopic solutions that otherwise would contact the peroxide. Thus, for example, the metal salts of fatty acids are found to be protecting agents for alkali-earth metal peroxides against chloride solutions, particularly chloride solutions of hygroscopic nature of the sort and concentration that are formed when calcium peroxide is distributed in common salt, or sodium chloride. Magnesium laurate, calcium stearate, and aluminum stearate are illustrative of solid particles that appear not only to be selectively adherent to alkali-earth metal peroxide, but also to repel solutions of chloride from contact with the peroxide surfaces. The combination of ability to separate the peroxide particles from adjacent substances, of ability to effect surface coverage, and the ability to repel aqueous chloride solutions from the alkali-earth metal peroxide particles renders metal soaps particularly effective to protect the peroxide against deterioration from moisture. The resulting indifference to atmospheric conditions of chloride compositions containing alkali-earth metal peroxide preserves the potency of the compositions, promotes improved physical condition, and greatly enhances their usefulness.

While in accordance with the patent statutes, I have described a preferred embodiment of this invention, it will now be apparent to those skilled in the art that alterations and modifications may be made within the scope of the appended claims.

What I claim is:

1. A composition comprising a mixture of alkali-earth metal peroxide stabilized against deterioration by moisture with finely divided water-insoluble salt of fatty acid.

2. A composition comprising a mixture of alkali-earth metal peroxide stabilized against deterioration by moisture with water-insoluble salt of fatty acid of fineness to pass a 44-micron sieve in proportion of about 30 to 250 parts relatively to 100 parts of the peroxide.

3. A composition comprising calcium peroxide and finely divided magnesium laurate in proportion of about 30 to 250 parts laurate relatively to 100 parts peroxide.

4. A composition comprising alkali-earth metal peroxide admixed with solid hygroscopic substance and containing intimately distributed therethrough finely divided water-insoluble metal soap.

5. A composition comprising sodium chloride in predominant amount and alkali-earth metal peroxide stabilized against deterioration by moisture by intermixture of finely powdered, water-insoluble metal soap.

6. A composition comprising sodium chloride in predominant amount and alkali-earth metal peroxide, stabilized against deterioration by moisture by intermixture of magnesium soap.

7. A composition comprising sodium chloride in predominant amount and alkali-earth metal peroxide, stabilized against deterioration by moisture by intermixture therethrough of finely divided water-insoluble salt of fatty acid.

8. A composition comprising sodium chloride in predominant amount and alkali-earth metal peroxide, stabilized against deteriorative effect of moisture by intermixture therethrough of aluminum stearate.

9. A composition comprising sodium chloride in predominant amount and alkali-earth metal peroxide, stabilized against deteriorative effect of moisture by intermixture therethrough of calcium stearate.

10. A composition comprising at least 90% sodium chloride, about 0.5% calcium peroxide, and from 0.01 to 1% magnesium laurate intimately distributed through the mixture.

11. A composition comprising at least 90% sodium chloride, about 0.5% calcium peroxide, and intimately distributed through the mixture from 0.01 to 1% magnesium laurate of particle size to pass substantially a 44-micron sieve.

12. Process of stabilizing alkali-earth metal peroxide against deterioration by moisture comprising intimately distributing in contact with the peroxide finely divided water-insoluble metal soap.

13. Process of stabilizing a mixture of alkali-earth metal peroxide with solid hygroscopic substance comprising intimately distributing through the mixture magnesium soap, finely divided to the order to pass a 44-micron sieve.

14. Process of stabilizing a mixture of alkali-earth metal peroxide with solid hygroscopic substance comprising intimately distributing through the mixture water-insoluble metal soap, finely divided to the order to pass a 44-micron sieve.

15. Process of stabilizing a mixture of alkali-earth metal peroxide with sodium chloride comprising intimately distributing through the mixture magnesium soap, finely divided to the order to pass a 44-micron sieve.

16. A method of stabilizing a mixture of calcium peroxide and sodium chloride comprising intimately distributing therethrough magnesium laurate particles of size to pass a 44-micron sieve and in an amount of about 30 to 250 parts to 100 parts of the peroxide.

ALFRED LIPPMAN, JR.